US008515439B2

(12) United States Patent
Urie

(10) Patent No.: US 8,515,439 B2
(45) Date of Patent: Aug. 20, 2013

(54) DETERMINING LOCATION OF A MOBILE STATION IN A CELLULAR COMMUNICATION COVERAGE ZONE USING TIME SEQUENCE CORRELATION

(75) Inventor: Alistair Urie, Velizy (FR)

(73) Assignee: Alcatel Lucent, Paris (FR)

( * ) Notice: Subject to any disclaimer, the term of this patent is extended or adjusted under 35 U.S.C. 154(b) by 222 days.

(21) Appl. No.: 12/866,470

(22) PCT Filed: Feb. 6, 2009

(86) PCT No.: PCT/EP2009/051395
§ 371 (c)(1),
(2), (4) Date: Dec. 13, 2010

(87) PCT Pub. No.: WO2009/098303
PCT Pub. Date: Aug. 13, 2009

(65) Prior Publication Data
US 2011/0092218 A1    Apr. 21, 2011

(30) Foreign Application Priority Data
Feb. 8, 2008    (EP) .................................... 08290118

(51) Int. Cl.
*H04W 72/04* (2009.01)
(52) U.S. Cl.
USPC ..................... 455/450; 455/456.1; 455/456.2; 455/522

(58) Field of Classification Search
USPC ............................ 455/450, 456.1, 456.2, 522
See application file for complete search history.

(56) References Cited

U.S. PATENT DOCUMENTS

| 5,873,040 A * | 2/1999 | Dunn et al. ................. 455/456.2 |
| 7,072,671 B2 * | 7/2006 | Leitch .......................... 455/456.1 |
| 2005/0157675 A1 * | 7/2005 | Feder et al. .................... 370/328 |
| 2007/0117573 A1 | 5/2007 | Kennedy et al. |

FOREIGN PATENT DOCUMENTS

| GB | 2 316 580 A | 2/1998 |
| WO | WO 03/094564 A | 11/2003 |
| WO | WO 2005/011321 A | 2/2005 |
| WO | WO 2005011321 A1 * | 2/2005 |

OTHER PUBLICATIONS

International Search Report for PCT/EP2009/051395.

* cited by examiner

*Primary Examiner* — Meless N Zewdu
*Assistant Examiner* — Jean Chang
(74) *Attorney, Agent, or Firm* — Fay Sharpe LLP

(57) ABSTRACT

The method of location of a mobile station within a radio coverage zone of a cell of a radio cellular network, comprises: building (50) a first time sequence indicating during which time intervals the mobile station has been allocated uplink transmission resources, for each remote antenna, building (54) a second time sequence indicating the total power strength of the uplink transmissions simultaneously received by this remote antenna, and correlating the first time sequence and at least one of the second time sequences, the first and second time sequences being synchronized in time, locating (53) the mobile station from the result of the correlation.

12 Claims, 2 Drawing Sheets

|  | 1 | 2 | 3 | 4 |
|---|---|---|---|---|
| ID01 | 1 |  | 1 |  |
| ID02 | 1 | 1 |  |  |
| ID03 |  |  | 1 | 1 |
| ID04 |  | 1 | 1 |  |
| ID05 |  | 1 |  | 1 |

|  | 1 | 2 | 3 | 4 |
|---|---|---|---|---|
| rrh1 | 1,8 | 0,9 | 0,7 |  |
| rrh2 |  |  |  |  |
| rrh3 |  |  | 0,8 | 1,2 |
| rrh4 |  |  |  |  |
| rrh5 |  | 0,8 | 0,9 | 0,8 |

|  | ID01 | ID02 | ID03 | ID04 | ID05 |
|---|---|---|---|---|---|
| rrh1 | 2,5 | 2,7 | 0,7 | 1,6 | 0,9 |
| rrh2 | 0 | 0 | 0 | 0 | 0 |
| rrh3 | 0,8 | 0 | 2 | 0,8 | 1,2 |
| rrh4 | 0 | 0 | 0 | 0 | 0 |
| rrh5 | 0,9 | 0,8 | 1,7 | 1,7 | 1,6 |

DETERMINING LOCATION OF A MOBILE STATION IN A CELLULAR COMMUNICATION COVERAGE ZONE USING TIME SEQUENCE CORRELATION

FIELD OF THE INVENTION

The present invention relates to a method and a system of location of a mobile station within a radio coverage zone of a cell and to a radio cellular network implementing this system.

BACKGROUND OF THE INVENTION

In radio cellular networks, a base station defines a radio coverage cell.

Herein after, we use the terminology which is common in radio cellular network like CDMA (Code Division Multiple Access), GSM (Global System for Mobile communication) or UMTS (Universal Mobile Telecommunication System) networks.

There exists base station connected to a plurality of distributed remote radio antennas, each of the remote antennas defining a respective radio coverage zone in the cell. Such a base station is useful to ensure indoor cellular radio coverage in a building or in several buildings. To this end, for example, the remote antennas are placed on different floors of the building. Typically, these remote antennas are connected to tire same transceiver through a local network so that die mobile station receives the same signal from multiple and physically separated radio antennas. These multiple copies of the same signal are treated by the mobile station as though they were radio reflections.

It may be necessary to locate a mobile station within a particular zone of such a cell. To this end, the mobile station location can be determined using time offsets measured on data uplink transmission. It is reminded that uplink transmissions are data transmissions from the mobile station to the base station. On the contrary, downlink transmissions are data transmissions from the base station to the mobile station.

Such a location method is not easy to implement and does work only if the number of distributed remote antennas remains small, i.e. inferior to ten.

An example of a radio cellular network with distributed radio antennas is described in US 2005/0157675 to Feder et al.

SUMMARY OF THE INVENTION

Accordingly, it is an object of the invention to provide a simple mobile station location method.

The invention provides a mobile station location method comprising:
building a first time sequence indicating during which time intervals die mobile station has been allocated uplink transmission resources to transmit through the cellular network,
for each remote antenna, building a second time sequence indicating the total power strength of the uplink transmissions simultaneously received by this remote antenna, and
correlating the first time sequence and at least one of the second time sequence, the first and second time sequences being synchronised in time,
locating (58) the mobile station from the result of the correlation.

It is easy to determine at which rime uplink transmission resources are allocated to a specific mobile station. Thus, the first time sequence is easy to build. It is also easy to measure the total radio power strength received by each remote antenna. Thus, the second time sequence is easy to build. Accordingly, the above location method is simple to implement.

The embodiments of the above terminal may comprise one or several of the following features:
the mobile station location is obtained by selecting the radio coverage zone defined by the remote antenna for which the second time sequence is the most correlated with the first rime sequence;
the mobile station location results from the weighting of the different remote antenna locations with the corresponding correlation results so as to obtain a mobile station location with a resolution strictly smaller than a radio coverage zone of a particular distributed remote antenna.

The above embodiments of the terminal presents the following advantage: using several correlation results to locate the mobile station allows for a location resolution better than a radio coverage zone.

The invention also relates to a system of location of a mobile station within a radio coverage zone of a cell of a radio cellular network, wherein the system comprises:
a uplink allocation monitor able to build a first time sequence indicating during which time intervals the mobile station has been allocated uplink transmission resources to transmit through the cellular network,
for each remote antenna, a uplink power monitor able to build a second time sequence indicating the total power strength of die uplink transmissions simultaneously received by this remote antenna,
a location measurement unit agent able to locate the mobile station from the result of a correlation between the first time sequence and at least one of the second time sequence, the first and second time sequences being synchronised in time.

The invention also relates to a radio cellular network comprising:
a mobile station,
a distributed antenna system having a plurality of distributed remote antennas, each remote antenna defining a radio coverage zone of a radio coverage cell,
a base station defining the radio coverage cell, the base station including at least one transceiver linked to the remote antennas through a local network, the transceiver being able to multicast or broadcast data received through the cellular network to the remote antennas, so that the very same data are transmitted over the air by the plurality of remote antennas,
wherein:
the radio cellular network comprises a uplink allocation monitor able to build a first time sequence indicating during which time intervals the mobile station has been allocated uplink transmission resources to transmit through the cellular network,
each remote antenna comprises an uplink power monitor able to build a second time sequence indicating the total power strength of the uplink transmissions simultaneously received by its antenna, and
the network composes a location measurement unit agent able to locate the mobile station from the result of a correlation between the first time sequence and at least one of the second time sequence, the first and second rime sequences being synchronised in rime.

The above radio cellular network makes possible to build a radio coverage cells that extends within buildings.

These and other aspects of the invention will be apparent from the following description, drawings and claims.

BRIEF DESCRIPTION OF THE DRAWINGS

In the drawings, the same reference numbers are used to designate the same elements.

In the following description, well-known functions or constructions by a person of ordinary skill in the art are not described in detail.

DETAILED DESCRIPTION

Figure 1:
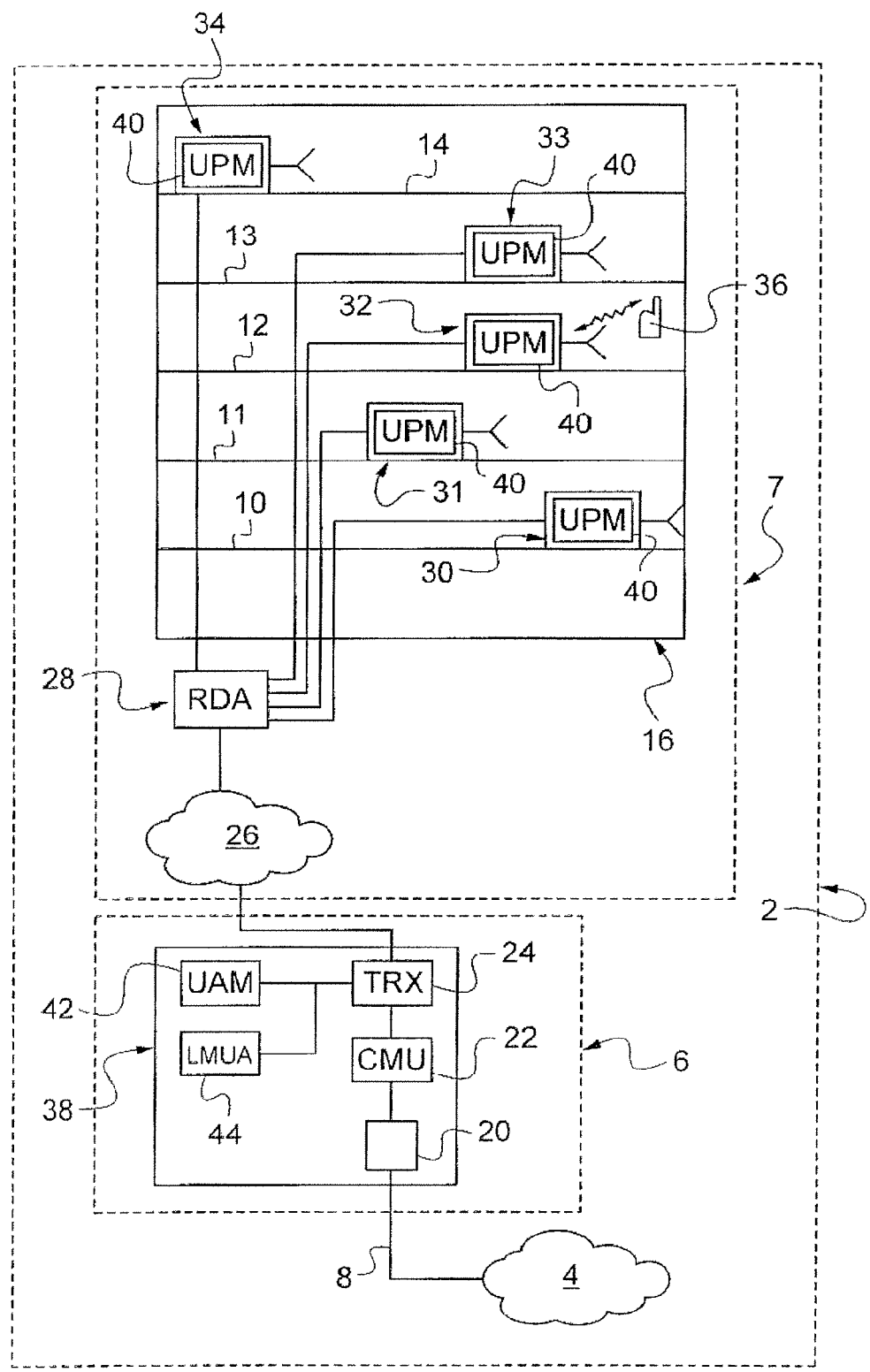
FIG. 1 is a schematic diagram of a radio cellular network having a base station, a distributed remote antenna system and a mobile station location system.

FIG. 1 shows a wide area radio cellular network 2. Hereinafter, for illustration purposes only, the description is done in the particular case of a CDMA (Code Division Multiple Access) network.

Network 2 has many base stations connected to a core network 4.

In FIG. 1, for simplicity, only one base station 6 is shown. Base station 6 is connected to core network 4 through a link 8.

Base station 6 is designed to create a radio coverage cell that extends over each floor 10 to 11 of a building 16. To this end, base station 6 is connected to a distributed antenna system 7. For example, base station 6 and system 7 are built according to the teaching of US2005/0157675. Therefore, the elements already disclosed in US2005/0157675 will not be described in details.

Base station 6 mainly comprises:
1) a network interface 20 for interfacing with the other components of core network 4 (e.g., a radio network controller (RNC));
2) a CDMA modem unit (CMU) 22 for coding and decoding incoming and outgoing message traffic, and
3) a transceiver 24 connected to CDMA modem unit 22.

Network interface 20, CMU 22 and transceiver 24 are hold in digital shelfs housed within a box 38. Box 38 may be physically located within building 16 or, alternatively, external to that building. CMU 22 is linked to interface 20.

System 7 includes:
1) a high speed data network 26 wire connected to transceiver 24,
2) a switch/summing node, referred to herein as radio distributor/aggregator (RDA) 28, wire connected to network 26,
3) a plurality of distributed remote antennas, referred to herein as remote radio heads (RRHs) 30-34, wire connected to RDA 28.
4) a mobile station 36.

For example, network 26 is gigabit Ethernet network.

Each RRH 30-34 has network interface equipment, timing and frequency synchronization equipment, signal processing elements, a power amplifier and one or more antennas to transmit radio signal over the air. RRH 30-34 are located on floor 10-14, respectively, so that each radio coverage zone created by each RRH corresponds to a respective floor.

For example, mobile station 36 is a mobile user or mobile terminal like a mobile cellular phone.

Base station 6 also includes a mobile station locution system. This system has:
a uplink power monitor (UPM) 40 housed within each RRH,
a uplink allocation monitor (UAM) 42 housed, for example, within box 38, and
a location measurement unit agent (LMUA) 44 housed, for example, within box 38.

UPM 40 measures, during a time interval, the total power strength of die uplink transmission received though the antenna of die RRH in which it is installed. These measurements are carried out on several successive time intervals and stored in a time sequence S2j. Sequence S2j indicates the evolution of the measured power strength as a function of the time interval. Index j identifies the RRH. Each sequence S2j is associated to a RRH identifier of die RRH from which it has been built. RRH 30 to 34 correspond to identifiers rrh1 to rrh5, respectively.

UAM 42 builds, for each mobile station in the cell, a rime sequence S1i. Sequence S1i indicates during which time interval, uplink transmission resources have been allocated to this mobile station. Index i identifies the mobile station. Each sequence S1i is associated with an identifier of the mobile station for which this sequence has been built. For example, UAM 42 uses the TMSI (Temporary Mobile Subscriber Identity) or the IMSI (International Mobile Subscriber Identity) to identify a mobile station.

For instance, UAM 42 builds time sequence S1i from data collected in a centralized resource allocation module (not shown). Usually, a mobile station which has traffic data to send requires die allocation of resources to the centralized resource allocation module. The latter, by taking into account a plurality of resource allocation requests from different mobile stations and specific parameters contained in the resource allocation request message (i.e. user type) allocates resources to the mobile stations. The general term "resources" should be understood in the framework of the present invention as radio resources i.e. either a frequency channel and/or a rime slot of a frame that is/are reserved for a radio station to communicate with the wireless radio network. Frequency channels, respectively time slots, are usually resources used in FDMA, respectively TDMA networks. A resource can be a code in CDMA networks, it may also be a combination of frequency channel, time slot and code.

Time sequences S1i and S2j are synchronised in time. For example, the time origin is the same for every time sequence. To this end, UAM 42 and each UPM 40 can be provided with internal synchronised clocks. Clock synchronisation result from data packet exchanges through network 26.

LMUA 44 determines the location of mobile stations from time sequences S1i and S2j. More details on UMP 40, UAM 42 and LMUA 44 will be given in view of FIG. 2.

The general operation of base station 6 will now be described.

For downlink signals, instead of receiving and transmitting coded cellular radio signals over die air, transceiver 24 functions to forward mobile user-coded baseband signals over high-speed data network 26 to RDA 28, and subsequently to all remote radio heads where the baseband signals are converted to radio frequency and then broadcasted over the air to a message recipient, such as mobile station 36.

Specifically, on the downlink, when a signal is addressed to mobile station 36 in building 16, die illustrative transceiver 24, receives digital I and Q baseband signals generated by CMU 22 and stores them in a buffer. Once the buffer reaches a predetermined level, or a predetermined amount of time has passed, transceiver 24 forms an Ethernet packet of those signals having a destination address. Typically, the destination address is a broadcast address so that all the RRHs receive the same signals.

The packets are then sent via network 26 from transceiver 24 to RDA 28 over network 26. For downlink signals, the RDA acts essentially as a switch having a plurality of pons. Each port on the RDA corresponds to an addressable radio coverage zone for the routing of messages. For example, each port of RDA 28 is identified as a separate radio coverage zone. Herein, each radio coverage zone, in turn, corresponds to one remote radio heads (RRH), such as RRHs 30-34, corresponding to an area of wireless coverage within building 16.

When the RDA 28 receives a message from the transceiver 24 having a broadcast address, the RDA 28 forwards a copy of the packet to the every ports for further dissemination to the corresponding RRH. The network interface equipment of each destination RRH receives the packets from the network and removes the headers from the packets. The I and Q baseband signals are then forwarded to the timing and synchronization equipment where the signals are buffered. The signals are then processed, converted to RF format and played out to the power amplifier and broadcast over the air via the antennas to mobile station 36. Thus, die mobile station is likely to receive the same signal from multiple, and physically separated antennas. The mobile station will only be able to treat these signals as though they were radio reflections and not be able to identify which particular antenna is associated with which part of the overall received radio signal. In such a case any range measurements made by either the base station transceiver or the mobile station would be meaningless and cannot be used to make a reliable estimation of the mobile station location.

Similarly, on the uplink, when mobile station 36 transmits messages, those messages are transmitted via RRH 30-34, RDA 28 and network 26 to transceiver 24 and CMU 22 for further processing and distribution via network interface 20 and wireless network 4. On the uplink, however, the RDA 28 acts as a summing node and aggregates the uplink data packets.

The operation of the mobile station location system will now be described with reference to FIG. 2 in the particular case of the location of five mobile stations having the identifiers ID01 to ID05, respectively.

Initially, in a step 50, UAM 42 builds time sequences $S_{1i}$ for each one of the five mobile stations.

Figures 2, 3, 4, 5:
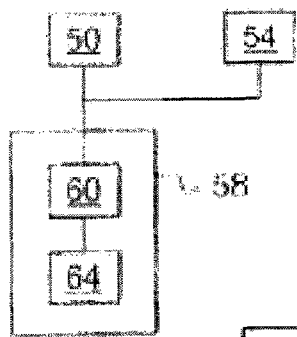
FIG. 2 is a flowchart of a method of location of a mobile station within a radio coverage zone of a cell of the radio cellular network of FIG. 1.
FIGS. 3 to 5 are matrices used to illustrate how the mobile station location is determined in the radio cellular network of FIG. 1.

Then, for example, UAM 42 aggregates the five sequences $S_{1i}$ to form a table 52 (FIG. 3). Numbers 1 to 4 in the first line of fable 52 are time interval identifiers. In this simplified example, each time sequence $S_{1i}$ is only built over these four successive time intervals. The first column contains the mobile station identifiers ID01 to ID05. The cells of table 52 contain a "1" when uplink transmission resources were allocated to the mobile station during the corresponding time interval. Otherwise, the cell contains nothing. For instance, the line associated with identifier ID01 read as follow:
  uplink transmission resources were allocated to mobile station ID01 during rime intervals "1" and "3", and
  uplink transmission resources were not allocated to mobile station ID01 during time intervals "2" and "4".
At the end of step 50, table 52 is transmitted to LMUA 44.
In parallel to step 50, in a step 54, each UPM 40 builds its own sequence $S_{2i}$. At the end of step 54, each sequence is transmitted to LMUA 44 via RDA 28 and network 26.

Once LMUA 44 has received data from UAM 42 and each UPM 40, for example, it aggregates the received sequences $S_{2i}$ to form a table 56 (FIG. 4). The first line of table 56 is similar to the first line of table 52 and contains the time interval identifiers "1" to "4". The first column contains the identifiers rrh1 to rrh5 of each RRH 30-34. The cells of table 56 contain the value of the radio power strength measured during the corresponding time interval. For instance, the line associated with identifier rrh1 reads as follow: tire power strength of the uplink transmission received by RRH 30 during time intervals "1", "2", "3" and "4" are "1.8", "0.9", "0.7" and "0", respectively. Here, an empty cell means zero.

Subsequently, in a step 58, LMUA 44 locates the mobile stations from die data contain in tables 52 and 56.

Initially, in an operation 60, LMUA 44 computes the correlations between each sequence $S_{1i}$ and each sequences $S_{2i}$. To this end, it uses the data contained in tables 52 and 56. For example, the result $R_{1i}$ of the correlation of sequence $S_{1i}$, associated with identifier ID01, and sequence $S_{2i}$, associated with identifier rrh1, is computed according to the following relationship:

$$R_{1i}=1*1.8+0*0.9+1*0.7+0*0=2.5$$

The correlation results $R_{ij}$ obtained at the end of operation 60 are shown in a table 62 (FIG. 5). The first line and first column of table 62 contain mobile station identifiers ID01 to ID05 and RRH identifiers rrh1 to rrh5, respectively. The cells contain the different correlation results $R_{ij}$. For instance, the result $R_{1i}$ of the correlation between sequences $S_{1i}$ and $S_{2i}$ is stored in the cell at the intersection of the line and column associated with identifiers ID01 and rrh1, respectively.

Thereafter, in an operation 64, IMUA 44 determines, for each mobile station, which one of sequences $S_{2i}$ is the most correlated with the sequence $S_{1i}$ associated this mobile station identifier.

For example, as illustrated in table 62, it is the sequence $S_{2i}$ which is the most correlated with the sequence $S_{1i}$. Thus, LMUA 44 establishes that RRH 30 is the closest RRH from mobile station ID01. From this, it results that this mobile station is likely to be on the first floor 10 of building 16.

It should be understood that time sequence $S_{1i}$ is representative of the time interval during which a mobile station i transmits a radio signal to one $RRH_i$. Accordingly, one can expect that rime sequences $S_{1i}$ and $S_{2i}$ are strongly correlated when mobile station i is close to $RRH_i$. On the contrary, the correlation between $S_{1i}$ and $S_{2i}$ should be low when mobile station i is not in the radio coverage zone of $RRH_i$.

In table 62, in each column, the highest correlation result has been emphasized. This indicates the estimated location of each one of the mobile station. In this example, mobile stations ID01 and ID02 are on the first floor. Mobile station ID03 is on the third floor. Mobile stations ID04 and ID05 are on the fifth floor.

There exist many other embodiments. For example, the above illustrative example specifically discusses one implementation of the present invention in a CDMA network. One skilled in the art, however, will recognize that the principles of the invention as herein described will be equally applicable to a GSM, UMTS, WiMAX (Worldwide Interoperability for Microwave Access, Inc.) or other wireless communications networks. In fact, the above teaching can apply to any cellular network where a cell is divided info a plurality of radio coverage zones through the use of a plurality of distributed remote antennas. For instance, the above teaching can be applied to distributed antenna system (DAS) disclosed in the prior art of US2005/0157675. In a DAS system, UPM is implemented in each in-building antenna and UAM and LMUA are implemented in the outdoor base station. The above described location system may also be implemented in purely analogue distributed antenna system based on RF cables, antennas and amplifier provided that power measurement is carried out at each receive antenna.

UAM or LMUA can be implemented in other cellular network equipments like equipments located in the core network.

UAM and LMUA can also be implemented in distributed antenna system 7. Thus, preferably, UAM 42 builds time sequence Su via monitoring and decoding of the base station's downlink control channel(s). Accordingly CAM 42 does not need to connect to any kind of centralized resource allocation module.

Instead of connecting directly to a physical slot in a digital shelf of box 38, transceiver 24 can be a separate component drat connects to a digital, radio frequency (RF), or intermediate frequency (IF) port, in such a configuration, the transceiver may receive digital coded baseband signals, as described above or, alternatively, may receive RF (Radio Frequencies) or IF (Intermediate Frequencies) signals and dien convert diose signals to digital form for buffering and packetizing.

In some cases the interface between the transceiver and die distributed remote antenna system is via a base station's RF (Radio Frequency) connector and so the transceiver is not even aware that it is being used to support a set of distributed remote antennas. In this latter case, network 26 and RDA 28 are omitted and each downlink signals are broadcasted by every remote antenna.

As one skilled in the art will recognize, RDAs can be connected as flexibly as regular data switches: multiple RDAs may be used in a cascaded fashion.

Typically, each base station has more than one transceiver 24, each of its transceiver 24 corresponding to a radio coverage sector. In such a situation, each sector can be divided into a plurality of radio coverage zones by connecting a respective distributed antenna system to the corresponding transceiver. The different distributed antenna systems connected to different base station transceivers are independent from each other.

One skilled in the art will recognize that the number of RRHs necessary to provide coverage to a particular floor will depend upon environmental factors such, as, illustratively, the number of obstructions (e.g., walls or other such obstacles) in proximity to the RRH.

Correlation between sequences $S_{1i}$ and $S_{2i}$ can be computed by using many other relationships than the one used in the above detailed description.

Higher location resolution is achieved by combining the correlation results obtain for the same time sequence $S_{1i}$. For example, a mobile station location can be estimated from the following relationship:

$$L_{MS} = \sum_{j=1}^{j=n} \alpha_j L_{rrhj}$$

where:
LMS is the coordinate estimation of die mobile station location,
$L_{rrhj}$ is the coordinates of the RRH corresponding to identifier rrhj, and
$\alpha_j$ is a weigh, value of which depend on tire result of the correlation between sequence S1$i$ associated to this mobile station and sequence S2$j$ associated to rrhj.

It is not necessary to compare between them the different correlation results to determine die mobile station location. In another embodiment, the different correlation results are compared to a predetermined threshold $S_a$. If the correlation is greater than threshold $S_a$, then the mobile station is in the radio coverage zone of the corresponding RRH.

A multicast address may be used instead of a broadcast address. The multicast address correspond to a specific set of RRHs so that when the multicast address is used, not every RRH receives the signals.

The invention claimed is:

1. A method of location of a mobile station within a radio coverage zone of a cell of a radio cellular network, the cell comprising a base station having a plurality of distributed remote antennas, each remote antenna defining a respective radio coverage zone within the cell, wherein the method comprises:
building a first time sequence indicating during which time intervals the mobile station has been allocated uplink transmission resources to transmit through the cellular network,
for each remote antenna, building a second time sequence indicating the total power strength of the uplink transmissions simultaneously received by said each remote antenna,
correlating the first time sequence and the second time sequence of said each remote antenna, the first and second time sequences being synchronised in time, and
obtaining a mobile station location from the result of the correlation.

2. The method according to claim 1, wherein the mobile station location is obtained by selecting the radio coverage zone defined by the remote antenna for which the second time sequence is the most correlated with the first time sequence.

3. The method according to claim 2, wherein the mobile station location results from the weighting of the different remote antenna locations with the corresponding correlation results so as to obtain the mobile station location with a resolution strictly smaller than a radio coverage zone of a particular distributed remote antenna.

4. The method according to claim 1, wherein the mobile station location results from the weighting of the different remote antenna locations with the corresponding correlation results so as to obtain the mobile station location with a resolution strictly smaller than a radio coverage zone of a particular distributed remote antenna.

5. A system for locating a mobile station within a radio coverage zone of a cell of a radio cellular network, the cell comprising a base station having a plurality of distributed remote antennas, each of the remote antenna defining a respective radio coverage zone within the cell, wherein the system comprises:
a uplink allocation monitor configured to build a first time sequence indicating during which time intervals the mobile station has been allocated uplink transmission resources to transmit through the cellular network,
for each remote antenna, an uplink power monitor configured to build a second time sequence indicating the total power strength of the uplink transmissions simultaneously received by said each remote antenna, and
a location measurement unit agent configured to locate the mobile station from the result of a correlation between the first time sequence and the second time sequence of said each remote antenna, the first and second time sequences being synchronised in time.

6. The system according to claim 5, wherein the location measurement unit agent is operative to obtain the mobile station location by selecting the radio coverage zone defined by the remote antenna for which the second time sequence is the most correlated with the first time sequence.

7. The system according to claim 6, wherein the location measurement unit agent is operative to obtain the mobile station location by weighting of the different remote antenna locations with the corresponding correlation results so as to obtain the mobile station location with a resolution strictly smaller than a radio coverage zone of a particular distributed remote antenna.

8. The system according to claim 5, wherein the location measurement unit agent is operative to obtain the mobile station location by weighting of the different remote antenna locations with the corresponding correlation results so as to obtain the mobile station location with a resolution strictly smaller than a radio coverage zone of a particular distributed remote antenna.

9. A radio cellular network comprising:
a mobile station,
a distributed antenna system having a plurality of distributed remote antennas, each remote antenna defining a radio coverage zone of a radio coverage cell, and a base station defining the radio coverage cell, the base station having at least one transceiver linked to the remote antennas through a local network, the transceiver being able to multicast or broadcast data received through the cellular network to the remote antennas, so that the very same data are transmitted over the air by the plurality of remote antennas,
wherein:
the radio cellular network comprises a uplink allocation monitor configured to build a first time sequence indicating during which time intervals the mobile station has been allocated uplink transmission resources to transmit through the cellular network,
each remote antenna comprises an uplink power monitor configured to build a second time sequence indicating the total power strength of the uplink transmissions simultaneously received by said each antenna, and
the network comprises a location measurement unit agent configured to locate the mobile station from the result of a correlation between the first time sequence and the second time sequence of said each remote antenna, the first and second time sequences being synchronised in time.

10. The radio cellular network according to claim 9, wherein the location measurement unit agent is operative to obtain the mobile station location by selecting the radio coverage zone defined by the remote antenna for which the second time sequence is the most correlated with the first time sequence.

11. The radio cellular network according to claim 10, wherein the location measurement unit agent is operative to obtain the mobile station location by weighting of the different remote antenna locations with the corresponding correlation results so as to obtain the mobile station location with a resolution strictly smaller than a radio coverage zone of a particular distributed remote antenna.

12. The radio cellular network according to claim 9, wherein the location measurement unit agent is operative to obtain the mobile station location by weighting of the different remote antenna locations with the corresponding correlation results so as to obtain the mobile station location with a resolution strictly smaller than a radio coverage zone of a particular distributed remote antenna.

* * * * *